(12) United States Patent
Kawasaki et al.

(10) Patent No.: US 10,995,894 B2
(45) Date of Patent: May 4, 2021

(54) UNIT, MANIFOLD, AND FLOW PATH FORMING METHOD

(71) Applicant: SAKURA RUBBER CO., LTD., Tokyo (JP)

(72) Inventors: Tetsuharu Kawasaki, Tokyo (JP); Kenzou Toshiro, Otawara (JP); Kazuyuki Tamada, Kanuma (JP); Misao Miyazawa, Otawara (JP)

(73) Assignee: Sakura Rubber Co., Ltd., Tokyo (JP)

( * ) Notice: Subject to any disclaimer, the term of this patent is extended or adjusted under 35 U.S.C. 154(b) by 106 days.

(21) Appl. No.: 16/033,768

(22) Filed: Jul. 12, 2018

(65) Prior Publication Data

US 2018/0320809 A1 Nov. 8, 2018

Related U.S. Application Data

(63) Continuation of application No. PCT/JP2017/000833, filed on Jan. 12, 2017.

(30) Foreign Application Priority Data

Jan. 14, 2016 (JP) .............................. JP2016-005307

(51) Int. Cl.
*F16L 41/03* (2006.01)
*F16L 37/23* (2006.01)
(Continued)

(52) U.S. Cl.
CPC ................ *F16L 41/03* (2013.01); *E03B 9/02* (2013.01); *F16L 3/02* (2013.01); *F16L 37/113* (2013.01);
(Continued)

(58) Field of Classification Search
CPC ......... F16L 41/08; F16L 37/23; F16L 37/113; F16L 37/252; F16L 3/02; F16L 41/03; E03B 9/02
See application file for complete search history.

(56) References Cited

U.S. PATENT DOCUMENTS 4,127,141 A * 11/1978 Ledonne et al. ...... F16L 55/124
137/15.15
5,857,713 A 1/1999 Horimoto
(Continued)

FOREIGN PATENT DOCUMENTS

CA 2 740 132 A1 11/2012
CN 1083552 C 4/2002
(Continued)

OTHER PUBLICATIONS

Jul. 17, 2019 Extended European Search Report, issued in connection with European Patent Application No. 17738480.7.
(Continued)

*Primary Examiner* — Kevin L Lee
(74) *Attorney, Agent, or Firm* — John P. White

(57) ABSTRACT

According to an embodiment, a manifold includes a plurality of units disposed in a liquid flow channel including a hose. The unit includes a hollow tube body, three or more tube stubs communicating the inside of the tube body, and a connection fitting provided with each of the tube stubs and detachably connected to a connection target of same shape. The manifold forms a flow path communicating the tube stubs of the units while the units are detachably connected together with the connection fittings.

9 Claims, 9 Drawing Sheets

(51) Int. Cl.
   *F16L 3/02*      (2006.01)
   *E03B 9/02*      (2006.01)
   *F16L 37/113*    (2006.01)
   *F16L 37/252*    (2006.01)
   *F16L 41/02*     (2006.01)

(52) U.S. Cl.
   CPC ............. *F16L 37/23* (2013.01); *F16L 37/252* (2013.01); *F16L 41/021* (2013.01)

(56) References Cited

U.S. PATENT DOCUMENTS

| | | | |
|---|---|---|---|
| 9,371,947 B2* | 6/2016 | Choi | F16L 37/2445 |
| 2003/0102039 A1* | 6/2003 | Marzorati | F16K 27/003 |
| | | | 137/883 |
| 2009/0065076 A1* | 3/2009 | Rossall | F16L 41/03 |
| | | | 137/602 |
| 2012/0312404 A1* | 12/2012 | Choi | F24D 3/1075 |
| | | | 137/883 |
| 2013/0248009 A1 | 9/2013 | Williams et al. | |

FOREIGN PATENT DOCUMENTS

| | | |
|---|---|---|
| CN | 103314165 A | 9/2013 |
| DE | 727 986 C | 11/1942 |
| DE | 696 12 456 T2 | 7/2001 |
| EP | 0 715 112 A2 | 6/1996 |
| EP | 0 770 809 A1 | 5/1997 |
| EP | 2 649 245 A1 | 10/2013 |
| JP | 58-184387 A | 10/1983 |
| JP | 3-114694 U | 11/1991 |
| JP | 5-164284 A | 6/1993 |
| JP | 7-208655 A | 8/1995 |
| JP | 8-199662 A | 8/1996 |
| JP | 8-270876 A | 10/1996 |
| JP | 9-196252 A | 7/1997 |
| JP | 2000-179778 A | 6/2000 |
| JP | 3375315 B2 | 2/2003 |
| JP | 2007-232178 A | 9/2007 |
| JP | 2011-085263 | 9/2011 |
| JP | 2011-027242 | 10/2011 |
| JP | 2014-502680 A | 2/2014 |
| WO | WO 2012/078188 A1 | 6/2012 |

OTHER PUBLICATIONS

Jul. 31, 2019 Office Action, issued in connection Chinese Patent Application No. 201780006379.9 and English language translation.
Aug. 20, 2019 Office Action, issued in connection with Japanese Patent Application No. 2017-561157.
International Search Report dated Feb. 7, 2017 in connection with PCT International Application No. PCT/JP2017/000833.

* cited by examiner

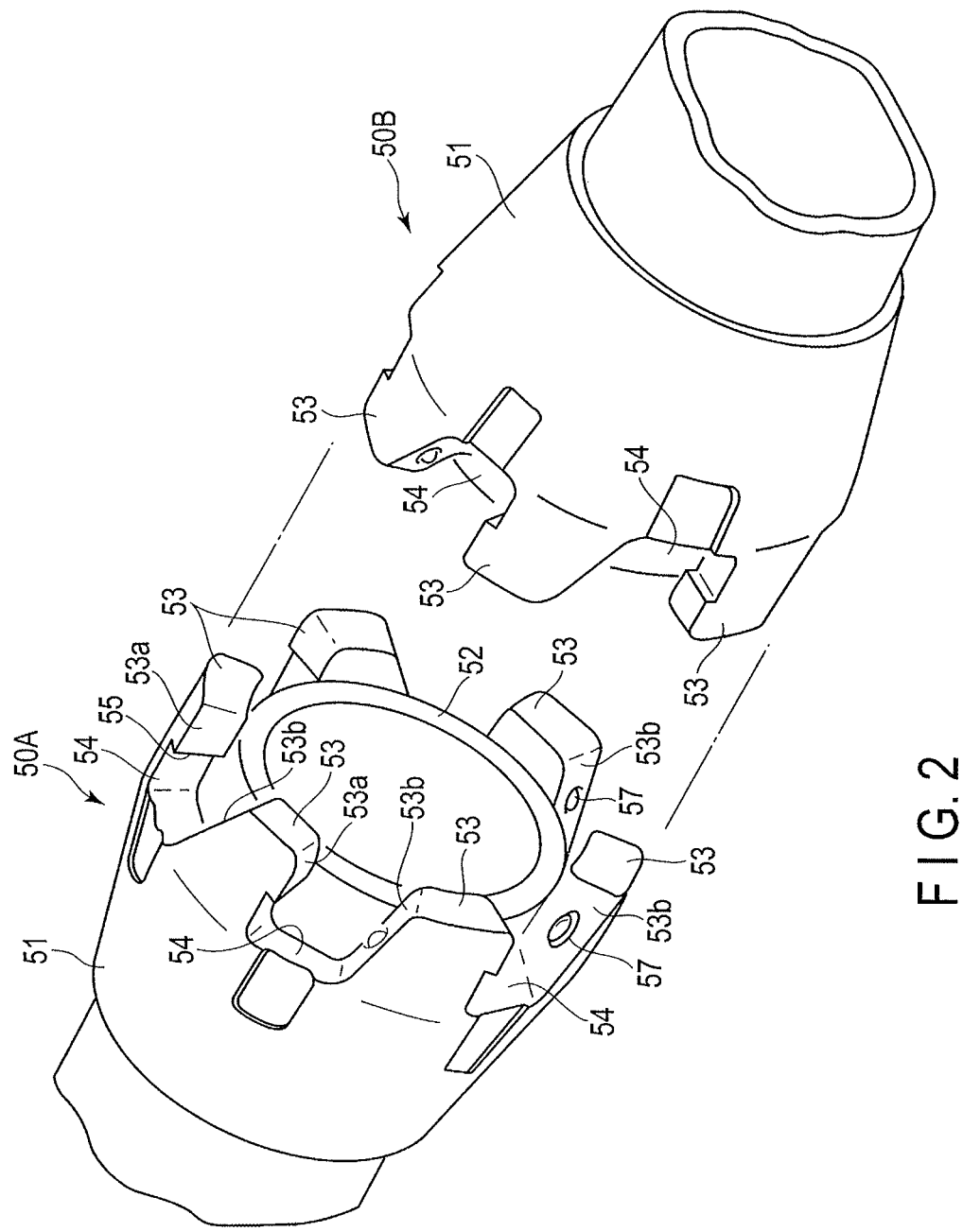
F I G. 2

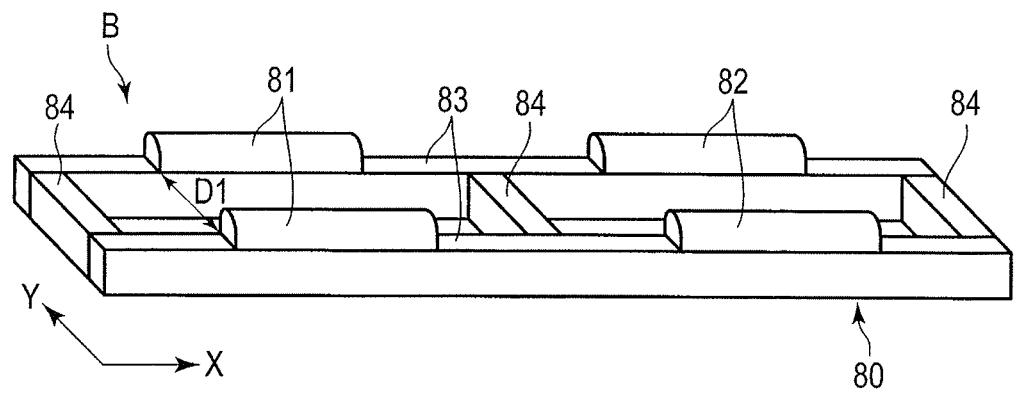
F I G. 6
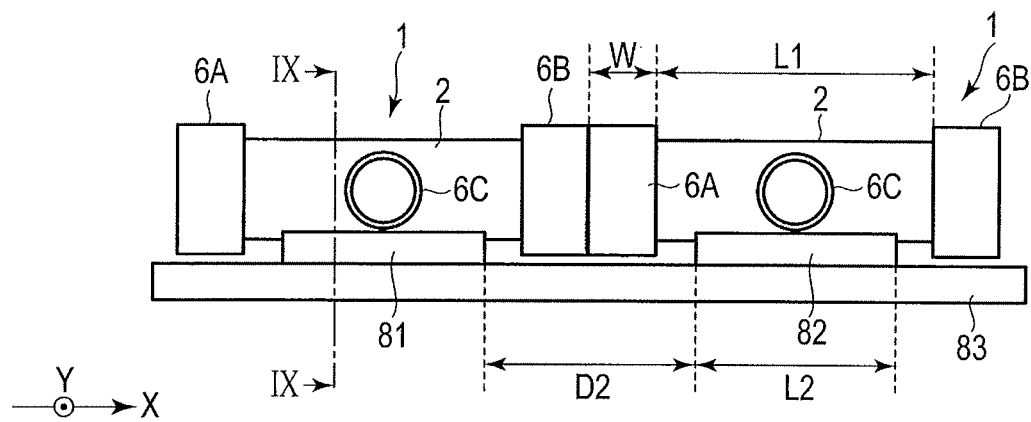
F I G. 7
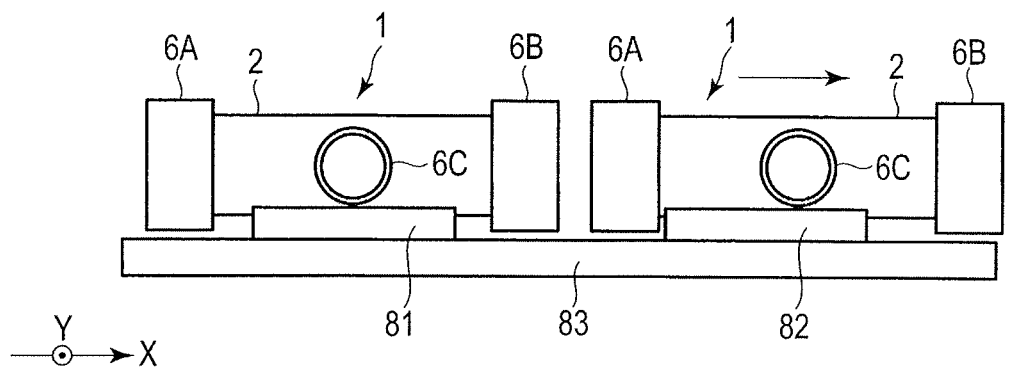
F I G. 8

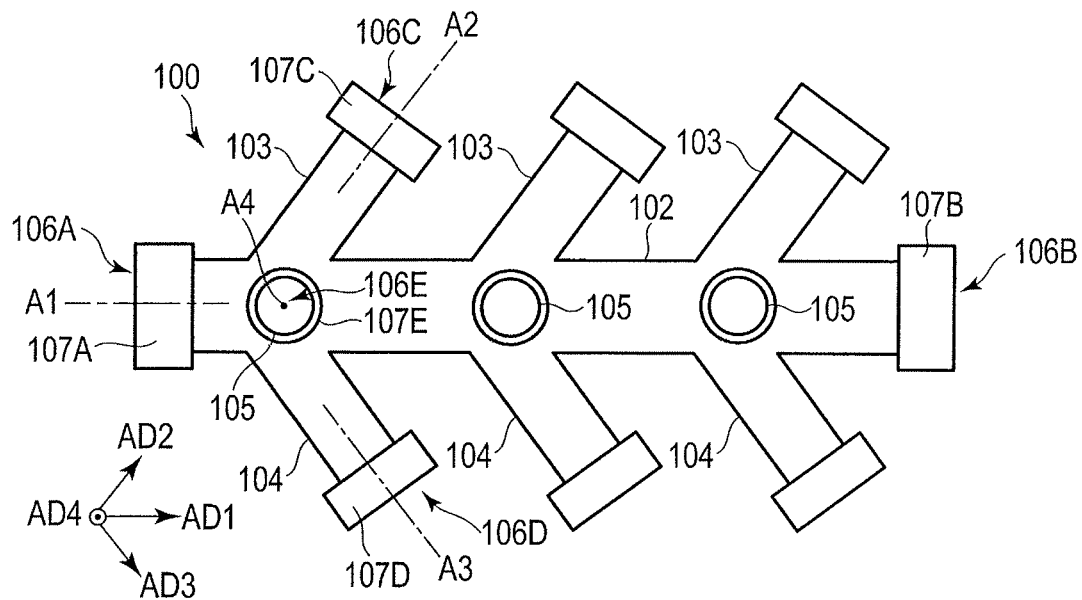
F I G. 12
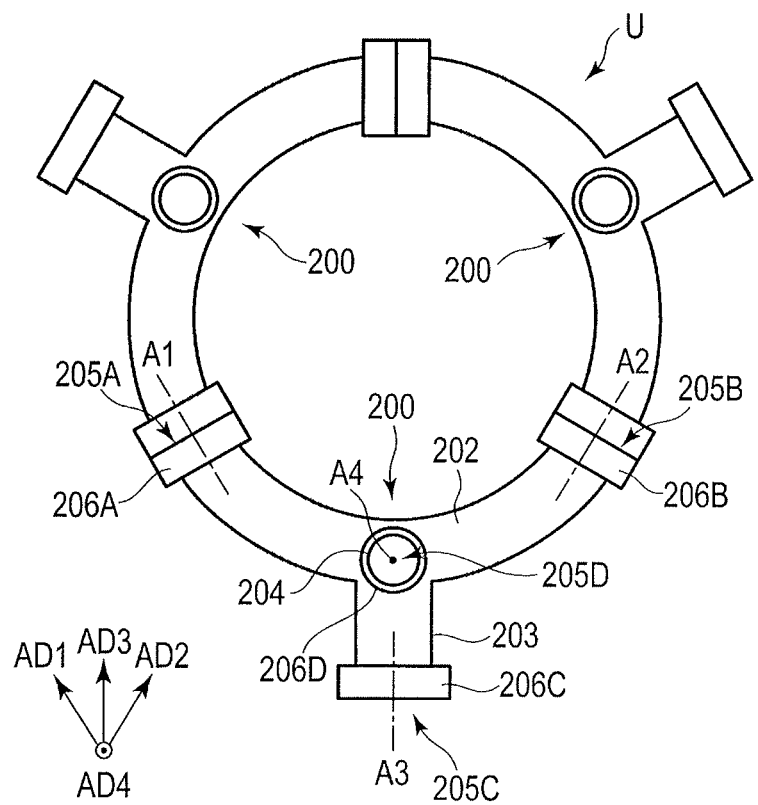
F I G. 13

UNIT, MANIFOLD, AND FLOW PATH FORMING METHOD

CROSS-REFERENCE TO RELATED APPLICATIONS

This application is a Continuation Application of PCT Application No. PCT/JP2017/000833, filed Jan. 12, 2017 and based upon and claiming the benefit of priority from prior Japanese Patent Application No. 2016-005307, filed Jan. 14, 2016, the entire contents of all of which are incorporated herein by reference.

BACKGROUND OF THE INVENTION

1. Field of the Invention

The present invention relates to a manifold disposed in a water supply path to divide or gather water.

2. Description of the Related Art

In firefighting situations, water supply techniques are important for smooth and effective procedure. Furthermore, in various fields such as drinking water and agricultural water, improved water supply techniques are desired for various purposes.

For example, in the firefighting field, long distance water supply and greater amount water supply are focused in recent years. Systems of long distance water supply and greater amount water supply are, basically, structured to supply a great amount of water using a hose of great diameter (for example, diameter of 100 to 400 mm, for example) to a desired location. The water supplied through a hose from a water source are divided into a plurality of flow paths by a manifold having a plurality of tube stubs as need be. Furthermore, the water supplied through a plurality of hoses may be gathered by a manifold. Manifolds connected to hoses of large diameter naturally include tube stubs of large diameter. Such a manifold is heavy and requires great labor for transportation and connection.

Furthermore, as described in Patent Literature 1 (JP 2014-502680 A), in particular facilities such as an oil rig or a power plant, a water source and a possible fire starter are roughly predicted, and manifolds considered necessary can be arranged preliminarily.

However, in a general firefighting system in cities and towns, a water source and water supply destination must be selected depending on situations of disaster, and in that case, a manifold transported to a scene of disaster may be difficult to perform firefighting. For example, even if a change of water supply paths and increase of water discharge tubes are required at some point, a sufficient space to dispose manifolds may not be secured, and a number of tube stubs to connect hoses to the manifold may be insufficient, and then, the firefighting process may be blocked.

BRIEF SUMMARY OF THE INVENTION

An object of the present invention is to provide a unit for being detachably connected to other units to form a flexible flow path depending on use conditions, manifold including the connected units, and flow path forming method to assemble a manifold by connecting the units.

According to an embodiment, a manifold includes a plurality of units disposed in a liquid flow channel including a hose. The unit each includes a hollow tube body and three or more tube stubs communicating an inside and an outside of the tube body, and a connection fitting provided with each of the tube stub, the connection fitting which can be detachably connected to a connection target of same shape. The manifold forms a flow path to communicate the tube stubs of the units each other while the units are detachably connected together through the connection fittings.

According to an embodiment, a unit is provided in a liquid flow channel including a hose, and the unit includes: a hollow tube body; three or more tube stubs communicating the inside of the tube body; and a connection fitting provided with at least one of the tube stubs and detachably connected to a connection target of same shape. The tube stubs include: a first tube stub having an axis parallel to a first axis direction; a second tube stub having an axis parallel to a second axis direction crossing the first axis direction; and a third tube stub having an axis parallel to a third axis direction crossing a plan surface including the first axis direction and the second axis direction.

According to an embodiment, a flow path forming method is to form a manifold having a three-dimensional flow path using a plurality of units including: a first tube stub having an axis parallel to a first axis direction; a second tube stub having an axis parallel to a second axis direction crossing the first axis direction; a third tube stub having an axis parallel to a third axis direction crossing a plan surface including the first axis direction and the second axis direction; and connection fittings provided with each of the first, second, and third tube stubs and detachably connected to a connection target of same shape. The method includes: assembling a first segment in which at least two of the units are connected in the first axis direction with the connection fitting of the first tube stub of the unit; assembling a second segment in which at least two of the first segments are connected in the second axis direction with the connection fitting of the second tube of the unit; and assembling the manifold by connecting the second segments in the third axis direction with the connection fitting of the third tube stub of each unit of the second segments.

According to such a structure, a manifold, a unit, and a flow path forming method each of which is effective to form a flexible flow path depending on situations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a perspective view of a schematic structure of a pair of connection fittings connected together.

FIG. 6 shows an example of a base on which the unit is disposed.

FIG. 7 shows a state where a pair of connected units are disposed on the base.

FIG. 8 shows a state where a pair of unconnected units are disposed on the base.

FIG. 12 is a plan view of a schematic structure of a unit of a third embodiment.

FIG. 13 is a plan view of a schematic structure of a unit and a manifold of a fourth embodiment.

DETAILED DESCRIPTION OF THE INVENTION

Some embodiments will be described.

In embodiments, a manifold, unit, and flow path forming method to be mainly used in firefighting fields will be disclosed. Note that the technical ideas described in the embodiments can be applied to a manifold, unit, and flow path forming method targeted for a flow path used for drinking water supply, agricultural water supply, or industrial water supply, and a manifold, unit, and flow path forming method targeted for a flow path used for a fluid other than water.

First Embodiment

Now, the first embodiment will be explained.

Figure 1:
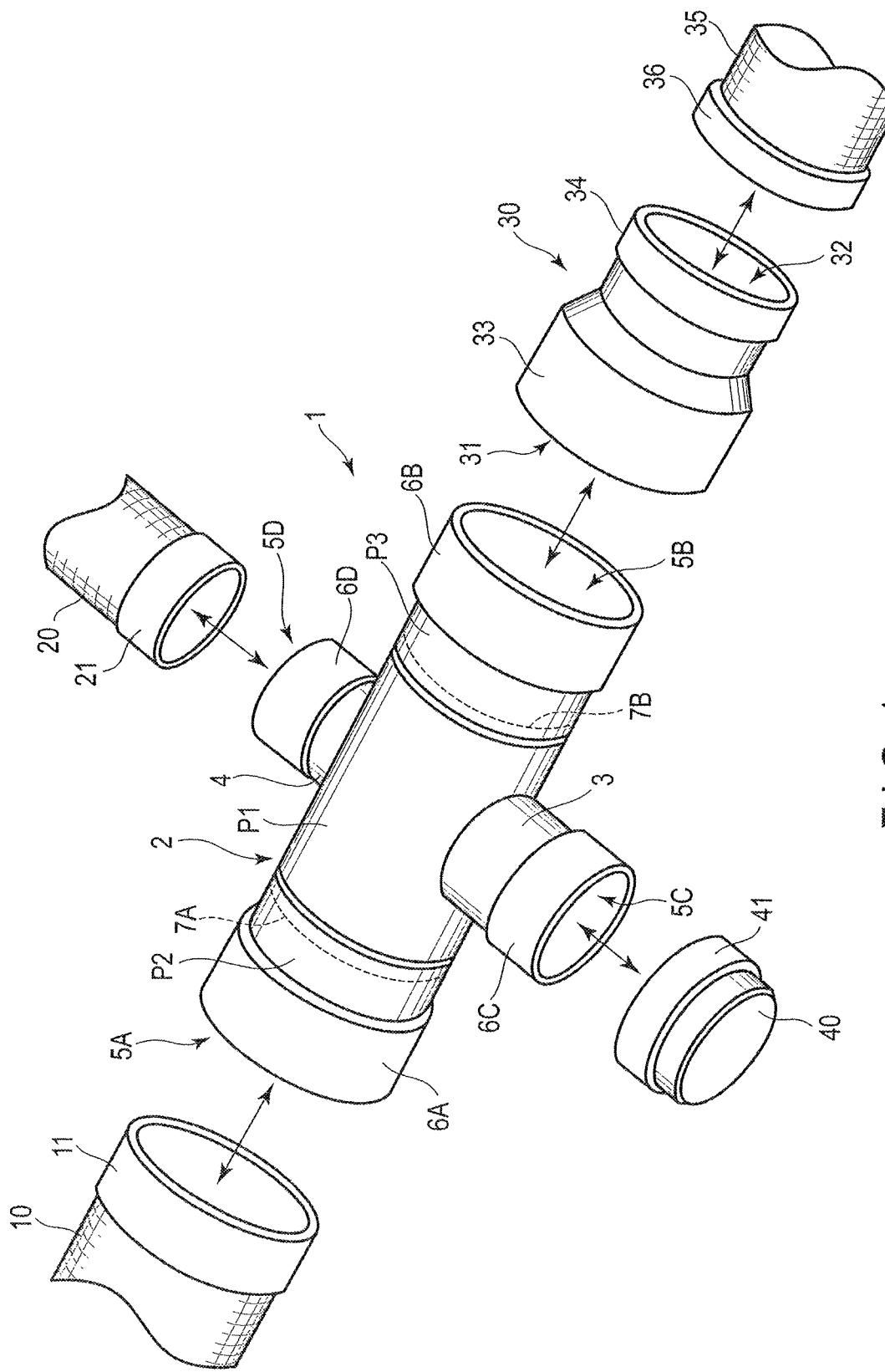
FIG. 1 is a perspective view of a schematic structure of a unit of a first embodiment.

FIG. 1 is a perspective view of a schematic structure of a unit 1 of the first embodiment. The unit 1 includes a hollow tube body 2. In the example of FIG. 1, the tube body 2 is annular extending linearly. However, the tube body 2 may have a different shape.

Furthermore, the unit 1 includes branches 3 and 4 extending from the tube body 2. The branches 3 and 4 are, for example, annular and extending (vertically, for example) in a direction crossing the extending direction of the tube body 2. In the example of FIG. 1, the branches 3 and 4 are arranged in a straight line crossing the tube body 2. That is, the unit 1 in FIG. 1 is shaped as a cross as a whole.

The tube body 2 includes tube stubs 5A and 5B at its both ends. The tube stubs 5A and 5B are examples of a first tube stub having an axis parallel to a first axis direction. The branch 3 includes a tube stub 5C (second tube stub) at its tip, and the branch 4 includes a tube stub 5D at its tip. Nozzle stubs 5C and 5D are examples of a second tube stub having an axis parallel to a second axis direction which crosses the first axis direction. Each of the tube stubs 5A to 5D communicates the inside of the tube body 2.

The diameter of the tube body 2 (diameter of the tube stubs 5A and 5B) is greater than the diameter of the branches 3 and 4 (diameter of the tube stubs 5C and 5D). For example, the diameter of each of the tube body 2 is 250 mm, and the diameter of each of the branches 3 and 4 is 150 mm. Note that, the diameter of the tube body 2 and the diameter of the branches 3 and 4 may be the same.

Furthermore, the unit 1 includes connection fittings 6A, 6B, 6C, and 6D. Connection fitting 6A is provided with the tube stub 5A, connection fitting 6B is provided with the tube stub 5B, connection fitting 6C is provided with the tube stub 5C, and connection fitting 6D is provided with the tube stub 5D. For example, connection fittings 6A and 6B have the same shape, and the connection fitting 6C and 6D have the same shape. In the present embodiment, the outer diameter of the connection fitting 6A and 6B is greater than that of the tube body 2, and the outer diameter of the connection fittings 6C and 6D is greater than the branches 3 and 4.

The tube body 2, branches 3 and 4, and connection fittings 6A, 6B, 6C, and 6D are mainly formed of a light metal material such as an aluminum alloy or a corrosion resisting aluminum.

In the example of FIG. 1, the tube body 2 is separated into a first part P1, second part P2, and third part P3. The parts P1 to P3 are annular. The branches 3 and 4 are connected to the first part P1. The tube stub 5A and the connection fitting 6A are provided with the second part P2. The tube stub 5B and the connection fitting 6B are provided with the third part P3.

The tube body 2 includes rotation mechanisms 7A and 7B (swivel mechanisms) which rotatably connect the connection fittings 6A and 6B and the tube body 2 around the axis of the tube body 2. The rotation mechanism 7A rotatably connects the second part P2 to the first part P1 while the axes of the parts P1 and P2 are matched. The rotation mechanism 7B rotatably connects the third part P3 to the first part P1 while the axes of the parts P1 and P3 are matched. Note that the branches 3 and 4 may include similar rotation mechanisms.

The unit 1 can be connected to various accessories using the connection fittings 6A to 6D. FIG. 1 shows hoses 10 and 20, relay fitting 30, and cap 40 as examples of such accessories.

The hose 10 includes a connection fitting 11 which can be connected to the connection fitting 6A (or 6B) at its end. The hose 10 has, for example, the same diameter as the tube body 2 (or tube stubs 5A and 5B). The hose 20 includes a connection fitting 21 which can be connected to the connection fitting 6D (or 6C). The hose 20 has, for example, the same diameter as the branches 3 and 4 (or tube stubs 5C and 5D).

The relay fitting 30 is, for example, annular and has a first opening 31 and a second opening 32. The diameter of the first opening 31 is greater than the diameter of the second opening 32. For example, the first opening 31 has a diameter of 250 mm, and the second opening 32 has a diameter of 150 mm. In the example of FIG. 1, the relay fitting 30 includes a first connection structure 33 provided with the first opening 31 and a second connection structure 34 provided with the second opening 32. The first connection structure 33 can be connected to the connection fitting 6B (or 6A). The second connection structure 34 can be connected to, for example, a connection fitting 36 attached to a hose 35. The second connection structure 34 may be connectable to the connection fittings 6C and 6D. With the relay fitting 30, connection fittings of different diameters (tube paths) can be connected together.

The cap 40 has an annular shape one end of which is opened, for example, and includes a connection structure 41 at the opening end. The connection structure 41 can be connected to the connection fitting 6C (or 6D), for example. The cap 40 blocks the tube stub 5C (or 5D) while the connection structure 41 and the connection fitting 6C (or 6D) are connected together. Note that the connection structure 41 may be formed to be connectable to the connection fittings 6A and 6B. In that case, the cap 40 blocks the tube stubs 5A and 5B while the connection structure 41 and the connection fittings 6A and 6B are connected together.

In the present embodiment, each of the connection fittings 6A to 6D of the unit 1, connection fitting 11, 21, and 36 and connection structures 33, 34, and 41 of accessories can be connected to a connection fitting of a connection target regardless of a male/female feature. Here, "regardless of a male/female feature" means that the types of connection fittings are not necessarily differed for the connection as in a case where one of connection fittings to be paired has a male screw and the other has a female screw. That is, the connection fittings of no male/female distinction can be detachably connected to connection fittings of same shape.

Examples applied to such connection fittings and connection structure will be described with reference to FIGS. 2 and 3.

FIG. 2 is a perspective view of a schematic structure of a pair of connection fittings 50A and 50B to be connected together. The connection fittings 50A and 50B include a substantially annular fitting body 51. The fitting body 51 includes an annular sealing member 52 on the inner peripheral surface. The front end surface of the sealing member 52 is a sealing surface and a sealing member such as rubber packing is attached. Thus, when the connection fittings 50A and 50B are fit and coupled with each other in the axis direction, the sealing surfaces of the sealing members 52 engage and the boundary of the sealing members 52 are sealed.

At the front end part of the fitting body 51, a plurality of (six, for example) protrusions 53 are formed. The protrusions 53 are arranged at regular intervals in the circumferential direction and protrude in the axis direction with respect to the sealing surface of the sealing member 52. A recess 54 is formed between adjacent protrusions 53. When the fitting bodies 51 of the connection fittings 50A and 50B are put together in the axis direction, the protrusions 53 of one connection fitting fit in the recesses 54 of the other connection fitting, and the protrusion 53 of the other connection fitting fit in the recesses 54 of one connection fitting. That is, the fitting bodies 51 of the connection fittings 50A and 50B complementarily fit. In FIG. 2, the connection fittings 50A and 50B have six protrusions 53 and are formed in a six-fold symmetry shape.

Note that the width of the recess 54 is formed slightly greater than the width of the protrusion 53. Thus, the protrusions 53 of one connection fitting fit in the recesses 54 of the other connection fitting in the axis direction and can be rotated to a certain extent in the circumferential direction.

A hook 55 is formed in a side surface 53a of each protrusion 53. The hook 55 is formed to engage a hook 55 of a counterpart protrusion 53 in the circumferential direction and to engage in a direction to be apart from each other along the axis. Thus, when the side surfaces 53a of the protrusions 53 of the connection fittings 50A and 50B approach to each other by rotating the connection fittings 50A and 50B while the protrusions 53 of one connection fitting fit in the recesses 54 of the other connection fitting, the hooks 55 of the protrusions 53 engage each other. With the engagement, the movement of the protrusions 53 in the axis direction is restricted and the connection fittings 50A and 50B are coupled together.

Figure 3:
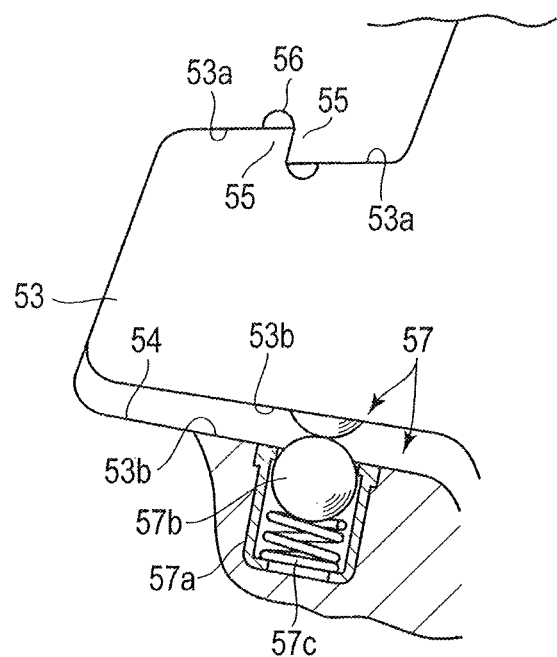
FIG. 3 shows a part of a pair of connection fittings connected together in an enlarged manner.

FIG. 3 is a schematic view of the proximity of the protrusions 53 connected together. In this example, a partial cross-section of the protrusions 53 is depicted also. In the example of FIG. 3, at the proximal part of the hooks 55 coupled together, a curve part 56 is formed to prevent stress concentration at the proximal part. Furthermore, the tip corner of the side surface 53b of each of the protrusions 53 is rounded in an arc shape.

The side surface 53b of the protrusion 53 is inclined with respect to the axis direction of the fitting body 51. The protrusion 53 is formed in a tapered shape such that the width of the circumferential direction is narrowed toward the tip thereof. Similarly, the recess 54 is formed in a tapered shape such that the width of the circumferential direction is narrowed toward the depth thereof. Thus, the engagement of the protrusion 53 and the recess 54 can easily be performed.

A bias mechanism 57 is provided with the side surface 53b of the protrusion 53. The bias mechanism 57 includes an bias member 57b accommodated in an annular case member 57a to freely expel from/take in the case member 57a and a spring 57c which biases the bias member 57b in a protrusion direction. The bias member 57b is, for example, a steel ball. The bias mechanism 57 is embedded in the side surface 53b of the protrusion 53 and a part of the bias member 57b protrudes from the side surface 53b. When a protrusion 53 of one connection fitting engages a recess 54 of the other connection fitting as shown in FIG. 3, the bias members 57b of the protrusions 53 of the connection fittings contact and press each other. Thus, the state where the hooks 55 of the protrusions 53 are coupled can be maintained.

When the coupling of the connection fittings 50A and 50B are released, the connection fittings are rotated in a direction which increases the bias force of the bias mechanism 57 against the force of the spring 57c. Thus, the engagement of the hooks 55 is released, and consequently, the coupling of the connection fittings 50A and 50B can be released.

As can be understood from the above, the connection fittings 50A and 50B as shown in FIGS. 2 and 3 have the same shape including the protrusions 53 and the recesses 54 and can be coupled together without a male/female feature. As connection fittings 6A to 6D of the unit 1, connection fittings 11, 21, and 36 and connections structures 33, 34, and 41 of the accessories, not only the connection fittings 50A and 50B but also connection fittings of various shapes can be applied as long as the connection fittings can be coupled with connection fittings of connection targets without a male/female feature.

Now, the rotation mechanisms 7A and 7B of FIG. 1 will be described.

Figure 4:
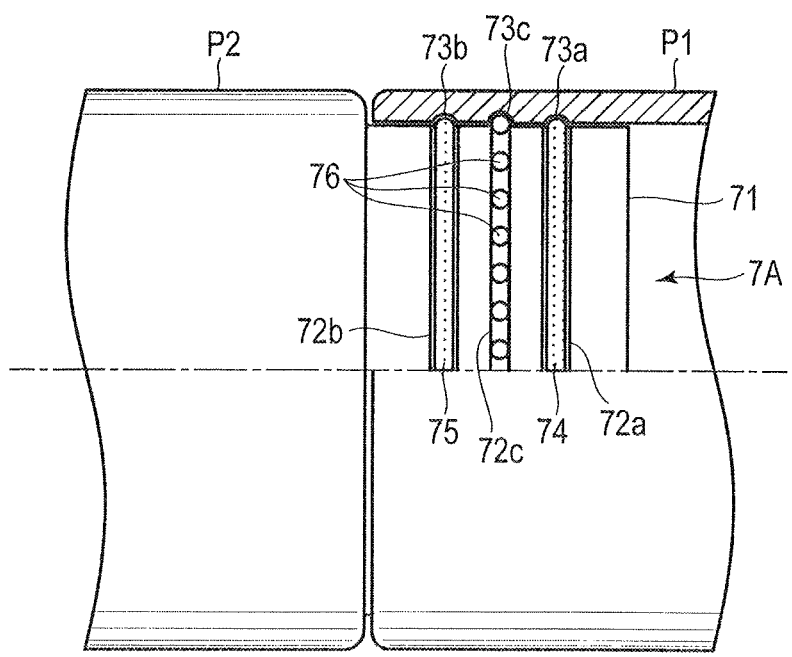
FIG. 4 shows an example of the structure applicable to a rotation mechanism.

FIG. 4 is a schematic view of an example of the structure applicable to the rotation mechanism 7A. In this example, a part of the first part P1 is depicted in a cross-sectional manner. The second part P2 includes an annular extension part 71 extending to the inside of the first part P1. On the outer peripheral surface of the extension part 71, ring-shaped grooves 72a, 72b, and 72c extending in the circumferential direction are formed. On the inner peripheral surface of the first part P1, ring-shaped grooves 73a, 73b, and 73c extending in the circumferential direction are formed.

The grooves 72a and 73a are opposed to each other, and a ring 74 is disposed therebetween. The grooves 72b and 73b are opposed to each other, and a ring 75 is disposed therebetween. Rings 74 and 75 are formed of, for example, a resin. The grooves 72c and 73c are opposed to each other and a plurality of balls 76 are arranged therebetween at regular intervals. The balls 76 are formed of a metal such as steel. The grooves 72c and 73c and the balls 76 form a bearing structure.

In such a structure, the boundary of the inner peripheral surface of the extension part 71 and the outer peripheral surface of the first part P1 is sealed by the rings 74 and 75. A gap between the first part P1 and the second part P2 is mainly sealed by the ring 74 and secondarily sealed by the ring 75. Furthermore, the first part P1 and the second part P2 can be rotated in the circumferential direction by the balls 76.

The rotation mechanism 7B has the same structure as the rotation mechanism 7A. Note that the rotation mechanisms 7A and 7B are not limited to the structure shown in FIG. 4 and a different structure may be applied. For example, in the structure of FIG. 4, the extension part 71 may be provided with the first part P1. Furthermore, only one of the rings 74 and 75 may be adopted.

The manifold of the present embodiment includes two or more of the units 1. Furthermore, the manifold may arbitrarily include accessories such as hoses 10 and 20, relay fitting 30, and cap 40. For example, if the structure shown in FIGS. 2 and 3 is applied to the connection fittings 6A to 6D, the manifold with flow paths having a desired shape and a desired number of openings can be formed by connecting the units 1.

Figure 5:
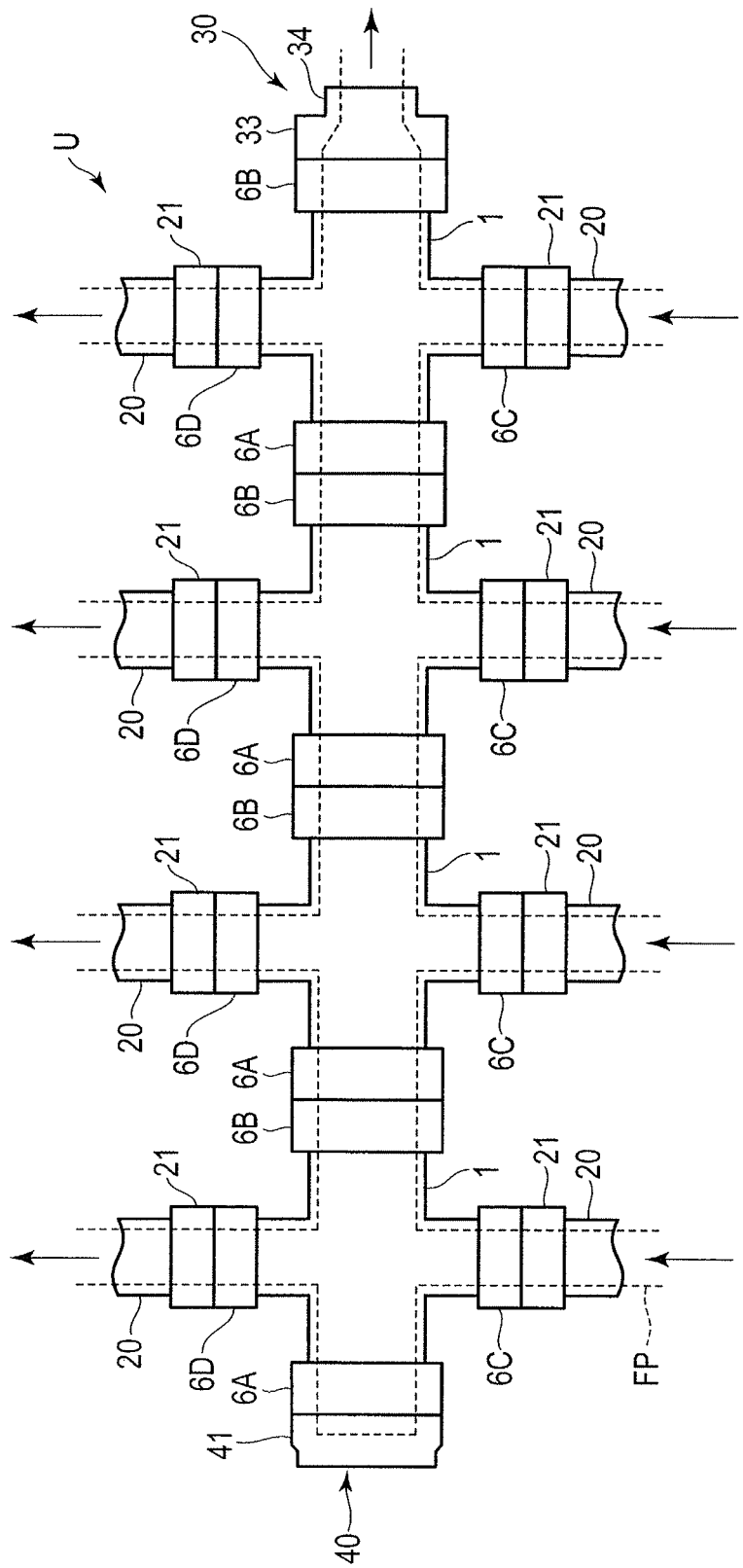
FIG. 5 shows an example of a flow path formed by a flow path forming method using units of the first embodiment.

FIG. 5 shows an example where a manifold U including a flow path is formed by a flow path forming method using a plurality of units 1. In this example, the manifold U includes four units 1. The units 1 are arranged in a line in a direction in which the tube body 2 extends (first axis direction), and connection fittings 6A and 6B of adjacent units 1 (that is, connection fittings provided with the tube stubs 5A and 5B, or a first tube stub) are connected. The units 1 intercommunicate each other.

In the connection fitting 6A of the leftmost unit 1 in the figure, a cap 40 having the connection structure 41 of same shape as the connection fitting 6A is formed. To the connection fitting 6B of the rightmost unit 1 in the figure, a relay fitting 30 having the connection structure 33 of same shape as the connection fitting 6B is connected. To the relay fitting 30, an element having a connection structure or a fitting of same shape as the connection structure 34 (for example, the hose 35) or the like is connected. To the connection fittings 6C and 6D, that is, the connection fittings provide with the tube stubs 5C and 5D, or the second tube stub, the connection fitting 21 of the hose 20 is connected.

The manifold U assembled as above forms a flow path FP divided into nine branches as shown by the dotted line in the figure. Arrows in the figure show water flows incoming to the flow path FP and outgoing from the flow path FP. That is, in this example, the nine branches include four inlet paths to the flow path FP and five outlet paths from the flow path FP.

Note that, in the example of FIG. 5, the connection fittings 6A and 6B have the same shape, and thus, the manifold U may be formed by coupling the connection fittings 6A together or the connection fittings 6B together. If the structure of FIG. 2 is adopted, during the connection of the connection fittings 6A and 6B, or the connection fittings 6A, or the connection fittings 6B, at least one of the fittings must be slightly rotated to engage the hooks 55. In the present embodiment, with the rotation mechanisms 7A and 7B are provided with the tube body 2, the entirety of the unit 1 is not necessarily moved during the connection. Furthermore, a position of the units 1 can be adjusted by the rotation mechanisms 7A and 7B after the connection.

In addition to the shape explained above, the units 1 can be combined to be a desired shape. For example, two or more units 1 may be combined by connecting same-shaped connection fittings 6C, connection fittings 6D, or connections fittings 6C and 6D to form the manifold U.

The manifold U may include a base on which the unit 1 is disposed. FIG. 6 shows an example of the base. The base B includes a frame 80, a pair of first supporting members 81, and a pair of second supporting members 82.

The frame 80 includes two square bars 83 extending in the first direction X and three square bars 84 extending in the second direction Y. Square bars 83 and 84 are metal square pipes formed of an aluminum alloy or the like. The second direction Y is orthogonal to the first direction X, for example. The square bars 84 are disposed between the square bars 83 at the leftmost end, rightmost end, and the middle thereof, and are connected to the square bars 83 with an arbitrary method such as welding. The square bars 83 and 84 may have plug-in ports to be assembled in a location of use.

Supporting members 81 and 82 have the same shape and are formed of a material of excellent smoothness such as an acetal resin (POM, for example) or a polyamide synthetic resin. The first supporting members 81 and the second supporting members 82 are arranged linearly in the first direction X. Specifically, the first supporting members 81 are attached on the square members 83 to be parallel to each other. Similarly, the second supporting members 82 are attached on the square member 83 to be parallel to each other. The supporting members 81 and 82 have a long shape extending in the first direction X. In the example of FIG. 6, the upper surfaces of the supporting members 81 and 82 is rounded.

By placing the tube body 2 between the first supporting members 81, one unit 1 can be supported by a pair of first supporting members 81. Similarly, by placing the tube body 2 between the second supporting members 82, one unit 1 can be supported by a pair of second supporting members 82.

FIG. 7 shows an example where one unit 1 is disposed on each of the first supporting member 81 and the second supporting member 82. The unit 1 disposed on the first supporting member 81 and the unit 1 disposed on the second supporting member 82 have matching axes of the tube body 2 (axes of the connection fittings 6A and 6B and axes of tube stubs 5A and 5B parallel to the first axis direction), and the connection fittings 6A, connection fittings 6B, or connection fittings 6A and 6B are opposed to each other. In FIG. 7, the connection fitting 6B of the unit 1 on the first supporting member 81 and the connection fitting 6A of the unit 1 on the second supporting member 82 are connected together.

As shown in FIG. 6, a gap between the first supporting members 81 along the second direction Y and a gap between the second supporting members 82 along the second direction Y are defined as first gap D1. Furthermore, as shown in FIG. 7, a gap between the supporting members 81 and 82 along the first direction X is defined as second gap D2, a width of the connection fittings 6A and 6B along the axis direction is defined as W, a length between the connection fittings 6A and 6B of one unit 1 is defined as first length L1, and a length of the supporting members 81 and 82 along the first direction X is defined as second length L2.

The second length L2 is less than the first length L1 (L2<L1). Furthermore, the second gap D2 is greater than the sum of widths W of two connection fittings (D2>2W). In such a structure, as shown in FIG. 8, by sliding one unit 1 in the first direction X, the connection fittings 6A and 6B connected together can be released. Similarly, by sliding one unit 1 to the other unit 1 from a state where two unconnected units 1 are disposed on the supporting members 81 and 82, the connection fittings 6A and 6B thereof can be coupled together. The second length L2 and the second gap D2 may be arbitrarily set such that the connection and release of the units 1 can be performed smoothly.

Figure 9:
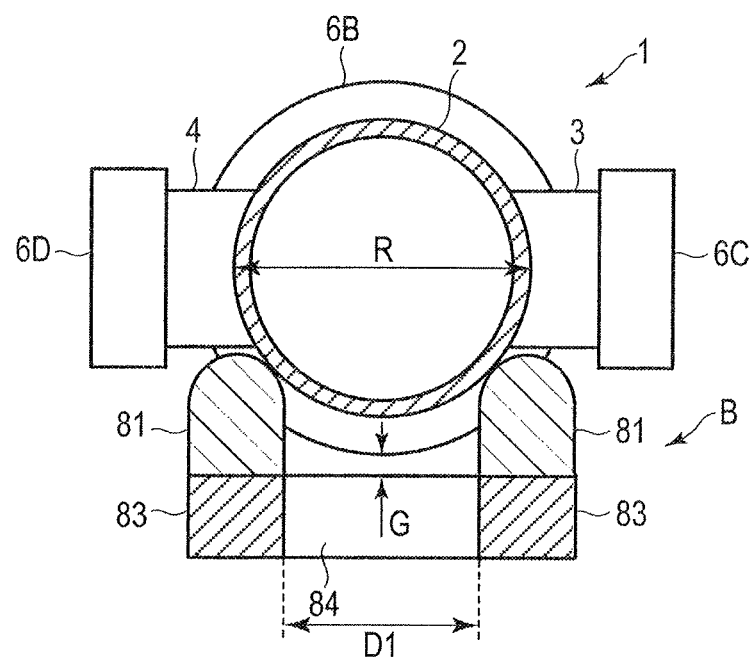
FIG. 9 shows a schematic cross-sectional view, taken along line IX-IX of FIG. 7.

FIG. 9 shows a schematic cross-sectional view taken along line IX-IX of FIG. 7. The first gap D1 is less than the outer diameter R of the tube body 2 (D1<R). Furthermore, the first supporting member 81 does not contact the branches 3 and 4. In such a structure, each first supporting member 81 contact the tube body 2 not directly below thereof but slightly sideways to stably support the tube body 2. Furthermore, while the tube body 2 is disposed on the first supporting members 81, a gap G is formed between the outer peripheral surface of the connection fittings 6A and 6B and the upper surface of the frame 80 (the flat surface including the upper surfaces of the square bars 83 and 84). Thus, the connection fittings 6A and 6B are floated from the frame 80 by the first supporting member 81 and the connection fittings 6A and 6B do not contact the frame 80. Thus, the unit 1 can be smoothly slid on the first supporting member 81 until the connection fitting 6A or the connection fitting 6B contacts the first supporting member 81 in the axis direction. Furthermore, the connection fittings 6C and 6D are floated from the frame 80, and in the example of FIG. 9, floated from the first supporting member 81, and thus, connection of a connection fitting such as a hose to a connection fitting can be performed easily. The above applies to the second supporting member 82.

Note that FIGS. 6 to 9 show the base B on which two units 1 are disposed. However, three or more units 1 may be mounted on the base B. For example, the base may be formed such that the manifold U of FIG. 5 can be mounted.

With the units 1 or the manifold U of the present embodiment, a flow path which connects water sources of optional number to destination of optional number in a disaster scene such as fire.

Conventionally, if a large number of branches were required in a flow path, a single large manifold having a large number of tube stubs has been used. However, with the units 1 as modules as in the present embodiment, such a large manifold is not necessary to prepare a manifold having a large number of branches. Furthermore, a single large manifold is heavy and a great work load is required for the transportation and connection processes while the manifold U formed by a plurality of units 1 as modules in the present embodiment can reduce the weight of each unit 1 and a work load of the transportation and connection processes can be significantly reduced.

Furthermore, with accessories such as relay fitting 30 and cap 40, the flexibility and work efficiency of flow path construction can further be improved. Furthermore, with the base B, the connection and release processes can be performed while the units 1 are stably supported when the manifold U is constructed, and an accidental risk to workers by movement caused by high pressure water flowing inside the manifold U after the connection of units 1 can be prevented.

In addition to the above advantages, various advantages can be achieved by the present embodiment.

Second Embodiment

Now, the second embodiment will be described. In the present embodiment, a variation of the unit 1 will be described. Unless otherwise specified, the structure is the same as in the first embodiment. Thus, same or similar elements as in the first embodiment will be referred to by the same reference numerals, and the detailed description considered redundant will be omitted.

Figure 10:
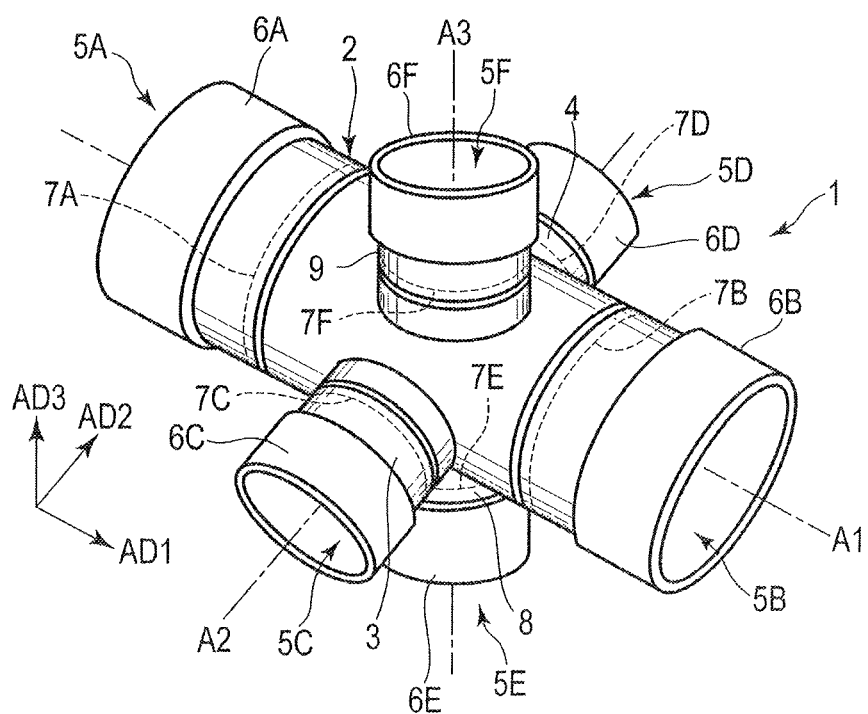
FIG. 10 is a perspective view of a schematic structure of a unit of a second embodiment.

FIG. 10 is a perspective view of a schematic structure of a unit 1 of the present embodiment. In addition to the elements shown in FIG. 1, the unit 1 includes branches 8 and 9 connected to the tube body 2. The branches 8 and 9 are, for example, annular and extending (vertically, for example) in a direction crossing the extending direction of the tube body 2 and the branches 3 and 4. That is, the branches 8 and 9 extend in a third axis direction AD3 which crosses a plan including a first axis direction AD1 parallel to the central axis of the tube body 2 and a second axis direction AD2 parallel to the central axis of the branches 3 and 4. The branches 8 and 9 disposed linearly with the tube body 2 interposed therebetween.

The branch 8 has a tube stub 5E (third tube stub) at its tip, and the branch 4 has a tube stub 5F (third tube stub) at its tip. The tube stubs 5E and 5F are example of a third tube stub having an axis parallel to the third axis direction. The tube stubs 5E and 5F intercommunicate the tube body 2. For example, the diameters of the branches 3, 4, 8, and 9 are the same and are less than the diameter of the tube body 2. Note that the diameter of the tube body 2 and the diameters of the branches 3, 4, 8, and 9 may be the same.

The unit 1 further includes connection fittings 6E and 6F. Connection fitting 6E is provided with the tube stub 5E, and connection fitting 6F is provided with the tube stub 5F. For example, connection fittings 6E and 6F have the same shape. The branches 8 and 9, and the connection fittings 6E and 6F are mainly formed of a light metal material such as an aluminum alloy or a corrosion resisting aluminum. The connection fittings 6E and 6F include connection structures of same shape without a male/female feature as in the connection fittings 6A to 6D.

Furthermore, the unit 1 includes a rotation mechanism 7C provided with the branch 3, rotation mechanism 7D provided with the branch 4, rotation mechanism 7E provided with the branch 8, and rotation mechanism 7F provided with the branch 9. The rotation mechanisms 7C and 7D rotataly connect the tube stubs 5C and 5D and the connection fittings 6C and 6D around the axes of the branches 3 and 4. The rotation mechanisms 7E and 7F rotatably connect the tube stubs 5E and 5F and the connection fittings 6E and 6F around the axes of the branches 8 and 9.

Here, as shown in FIG. 10, the first axis direction AD1, second axis direction AD2, and third axis direction AD3 are defined. The first axis direction AD1 is a direction parallel to the axis A1 of the tube stubs 5A and 5B (axis of the tube body 2). The second axis direction AD2 is a direction parallel to the axis A2 of the tube stubs 5C and 5D (axis of the branches 3 and 4). The third axis direction AD3 is a direction parallel to the axis A3 of the tube stubs 5E and 5F (axis of the branches 8 and 9). The axis directions AD1, AD2, and AD3 cross each other. Furthermore, the third axis direction AD3 crosses a plan including the first axis direction AD1 and the second axis direction AD2. In the example of FIG. 10, the axis directions AD1, AD2, and AD3 vertically cross each other.

As can be understood from the above, in a case where the unit 1 includes a plurality of tube stubs having axes parallel to at least three axis directions AD1, AD2, and AD3, a manifold U having a three-dimensional flow path can be formed by assembling the units 1 in the directions along the three axis directions AD1, AD2, and AD3.

Figure 11:
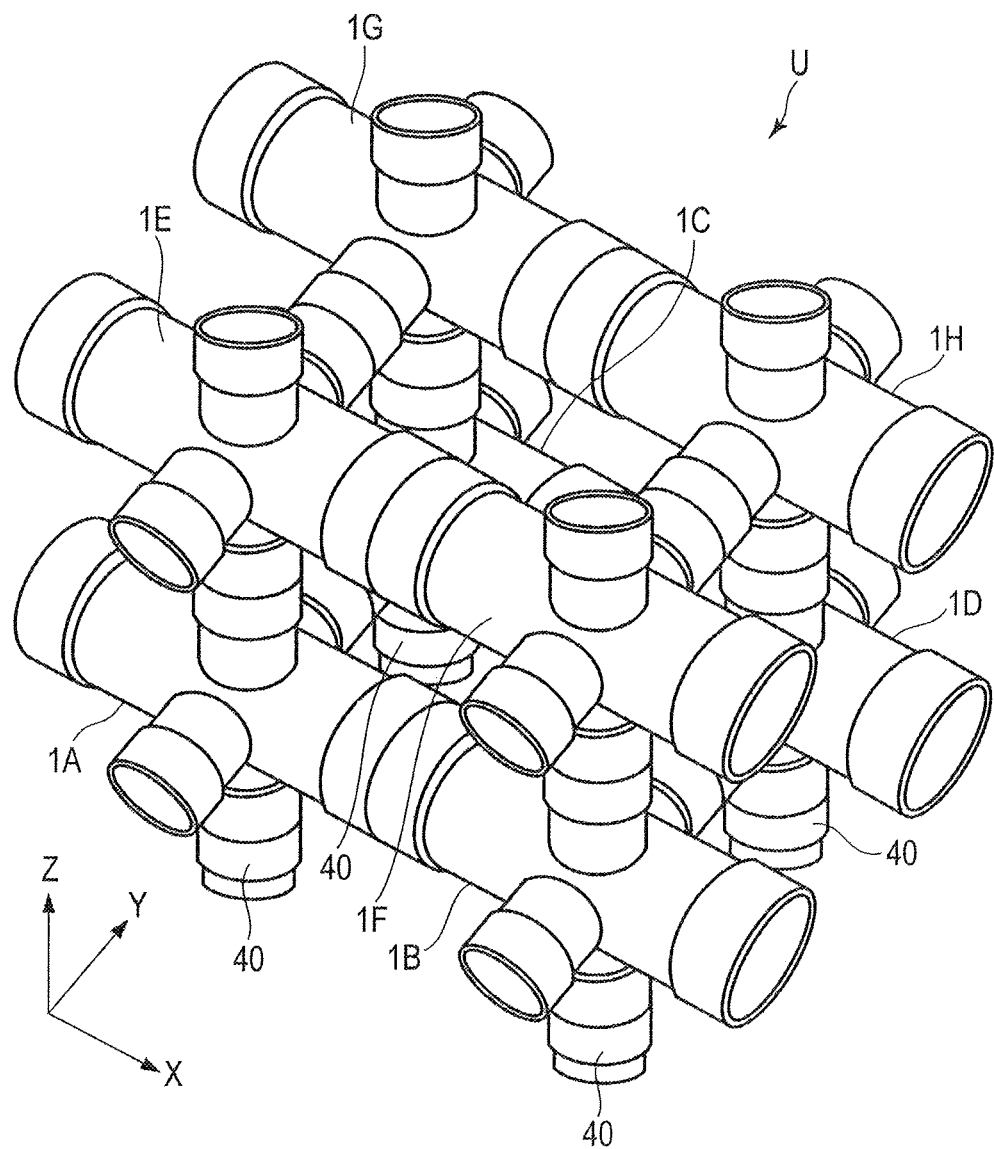
FIG. 11 shows an example of a flow path formed by a flow path forming method using units of the second embodiment.

FIG. 11 shows an example of a manifold U having a three-dimensional flow path using a plurality of units 1 of the present embodiment, wherein the manifold U is formed by a flow path forming method. In the example of FIG. 11, the manifold U includes eight units 1 (1A, 1B, 1C, 1D, 1E, 1F, 1G, and 1H). Here, units 1 arranged in the same direction (for example, Units 1A and 1B, 1C and 1D, 1E and 1F, 1G and 1H arranged in the first axis direction, units 1A and 1C, 1B and 1D, 1E and 1G, 1F and 1H arranged in the second axis direction, and units 1A and 1E, 1B and 1F, 1C and 1G, and 1D and 1H arranged in the third axis direction) form a primary segment connected together. The units 1A to 1D form a lower secondary segment provided with a mount surface such as a ground. The units 1E to 1H form an upper secondary segment disposed on the units 1A to 1D. Note that the secondary segment may be formed of units 1A-1B-1E-1F, or units 1A-1C-1E-1G, or units 1B-1D-1F-1H.

An example of a forming method of the manifold U having the flow path as in FIG. 11 will be described. Initially, units 1A and 1B and units 1C and 1D are connected in the first direction X (first axis direction) by connection fittings thereof to form the primary segments. Then, the primary segment of the units 1A-1B and the primary segment of the units 1C-1D are connected in the second direction Y (second axis direction) which crosses the first direction X (first axis direction) by the connection fitting thereof to form the secondary segment. Thus, the secondary segment is formed. Note that the first segments may be formed by connecting units 1 in the second direction Y and the third direction Z.

Then, the units 1E to 1H are assembled to form the upper secondary segment. The order of connection is optional, and for example, the units 1A and 1E are initially connected in the third direction Z (third axis direction) by the connection fittings thereof. The third direction Z is a direction crossing a plan including the first direction X and the second direction Y. In the example of FIG. 11, the directions X, Y, and Z are orthogonal to each other. Furthermore, the unit 1F is connected to the unit 1B, the unit 1G is connected to the unit 1C, and the unit 1H is connected to the unit 1D. The upper secondary segment may be mounted on the lower secondary segment such that they can be connected at the same time by their own weights. Furthermore, the secondary segments may be incorporated in the first direction X or the second direction Y.

The connection of units 1A to 1H may be performed by connection fittings 6A to 6F. By connecting the units 1A to 1H as above, a manifold U having a three-dimensional flow path in which water runs three-dimensional fashion therein can be formed. Since the connection fittings 6A to 6F can be rotated by the rotation mechanism 7A to 7F, the connection and release processes of the units 1A to 1H can be performed easily no matter what connection fitting is used.

Note that, between the connection fittings 6A to 6F of the lower units 1A to 1D, caps 40 are attached to ones contacting the mount surface. The caps 40 function as legs of the manifold U.

In the manifold U assembled as in FIG. 11, twenty tube stubs are not used for the connection of the units 1A to 1H or connected to caps 40. By connecting hoses, relay fittings, pressure gauge units, valve units, and the like to these twenty tube stubs, a manifold U having a desired flow path can easily be formed.

When the manifold U having a three-dimensional flow path by assembling units 1 in a three-dimensional manner, the installation area of the manifold U (area exclusive for the manifold) can be decreased. Thus, if the manifold U is used in a tight location, the structure of the present embodiment is especially effective. Furthermore, in the example of FIG. 11, available tube stubs of the upper units 1E to 1H are higher than the mount surface, and thus, the connection or release process of hoses and the like to the tube stubs can easily be performed.

In addition to the above advantages, various advantages can be achieved in the present embodiment.

Third Embodiment

Now, the third embodiment will be described. In the present embodiment, a variation of the unit will be described. FIG. 12 is a plan view of a schematic structure of a unit 100 of the present embodiment. The unit 100 includes a linearly extending tube body 102 and a plurality of branches 103, 104, and 105 connected to the tube body 102. In the example of FIG. 12, three branches 103, three branches 104, and three branches 105 are provided.

The tube body 102 is annular along the first axis direction AD1 and has tube stubs 106A and 106B at its both ends, for example. Each branch 103 is annular along the second axis direction AD2 and has a tube stub 106C at its tip, for example. Each branch 104 is annular along the third axis direction AD3 and has a tube stub 106D at its tip, for example. Each branch 105 is annular along a fourth axis direction and has a tube stub 106E at its tip, for example.

Connection fittings 107A, 107B, 107C, 107D, and 107E are attached to the tube stubs 106A, 106B, 106C, 106D, and 106E, respectively. The connection fittings 107A to 107E include the connection structure without a male/female feature as in the above-described connection fittings 6A to 6D. The tube body 102 and the branches 103 to 105, preferably, include the rotation mechanisms as with the above-described rotation mechanisms 7A and 7B.

Here, as shown in FIG. 12, the first axis direction AD1, second axis direction AD2, third axis direction AD3, and fourth axis direction AD4 are defined. The first axis direction AD1 is a direction parallel to the axis A1 of the tube stubs 106A and 106B (axis of the tube body 102). The second axis direction AD2 is a direction parallel to the axis A2 of the tube stubs 106C (axis of the branch 103). The third axis direction AD3 is a direction parallel to the axis A3 of the tube stub 106D (axis of the branch 104). The fourth axis direction AD4 is a direction parallel to the axis A4 of the tube stub 106E (axis of the branch 105). The axis directions AD1 to AD4 cross each other. In the example of FIG. 12, the second axis direction AD2 is inclined counterclockwise at an acute angle with respect to the first axis direction AD1, and the third axis direction AD3 is inclined clockwise at an acute angle with respect to the first axis direction AD1. Furthermore, the axis directions AD1 to AD3 are directions included in the same plan while the fourth axis direction AD4 is orthogonal to the plan. Here, in the present embodiment, while the axis of the tube body 102 (tube stubs 106A and 106B) is parallel to the first axis direction, the axes of the tube stubs 106C and 106D are regarded as the second axis direction crossing the first axis direction, and the axis of the tube stub 106E is regarded as the third axis direction crossing the plan including the first axis direction and the second axis direction.

With a plurality of units 100 described as above, the manifold U including a three-dimensional flow path of optional shape can be formed by optionally connecting the connection fittings 107A to 107E. Furthermore, the units 100 can be assembled in a three-dimensional fashion.

Fourth Embodiment

Now, the fourth embodiment will be described. In the present embodiment, another variation of the unit will be described. FIG. 13 is a plan view of a schematic structure of a manifold U including a unit 200 of the present embodiment. The unit 200 includes a unit 200, tube body 202, and branches 203 and 204 connected to the tube body 204.

The tube body 202 is annular extending in an arc shape and has tube stubs 205A and 205B at its both ends, for example. Each branch 203 is annular extending linearly and has a tube stub 205C at its tip, for example. Each branch 204 is annular extending linearly and has a tube stub 205C at its tip, for example.

Connection fittings 206A, 206B, 206C, and 106D are attached to the tube stubs 205A, 205B, 205C, and 205D, respectively. The connection fittings 206A to 206D include the connection structure without a male/female feature as in the above-described connection fittings 6A to 6D. The tube body 202 and the branches 203 and 204 may include the rotation mechanisms as with the above-described rotation mechanisms 7A and 7B.

Here, as shown in FIG. 13, the first axis direction AD1, second axis direction AD2, third axis direction AD3, and fourth axis direction AD4 are defined. The first axis direction AD1 is a direction parallel to the axis A1 of the tube stub 205A. The second axis direction AD2 is a direction parallel to the axis A2 of the tube stubs 205B. The third axis direction AD3 is a direction parallel to the axis A3 of the tube stub 205C (axis of the branch 203). The fourth axis direction AD4 is a direction parallel to the axis A4 of the tube stub 205D (axis of the branch 204). The axis directions AD1 to AD4 cross each other. In the example of FIG. 73, the first axis direction AD1 is inclined counterclockwise at an acute angle with respect to the third axis direction AD3, and the second axis direction AD2 is inclined clockwise at an acute angle with respect to the third axis direction AD3. Furthermore, the axis directions AD1 to AD3 are directions included in the same plan while the fourth axis direction AD4 is orthogonal to the plan.

With a plurality of units 200 described as above, the manifold U including a flow path of optional shape can be formed by optionally connecting the connection fittings 206A to 206D.

For example, as shown in FIG. 13, the tube body 202 of a plurality of units 200 can be shaped in a circle. In the example of FIG. 13, three units 200 of same shape are assembled in a circle. That is, the tube body 202 of each unit 200 corresponds to an arc of 120°. If the tube body 202 is set to an arc of 90°, four units 200 can be assembled in a circle, and if the tube body 202 is set to an arc of 180°, two units 200 can be assembled in a circle.

Furthermore, the units 200 can be assembled in a three-dimensional fashion. For example, when two manifolds U shown in FIG. 13 are connected to be layered in the fourth axis direction AD4, the manifold U including circular flow paths layered three-dimensionally can be formed.

Fifth Embodiment

Figure 14:
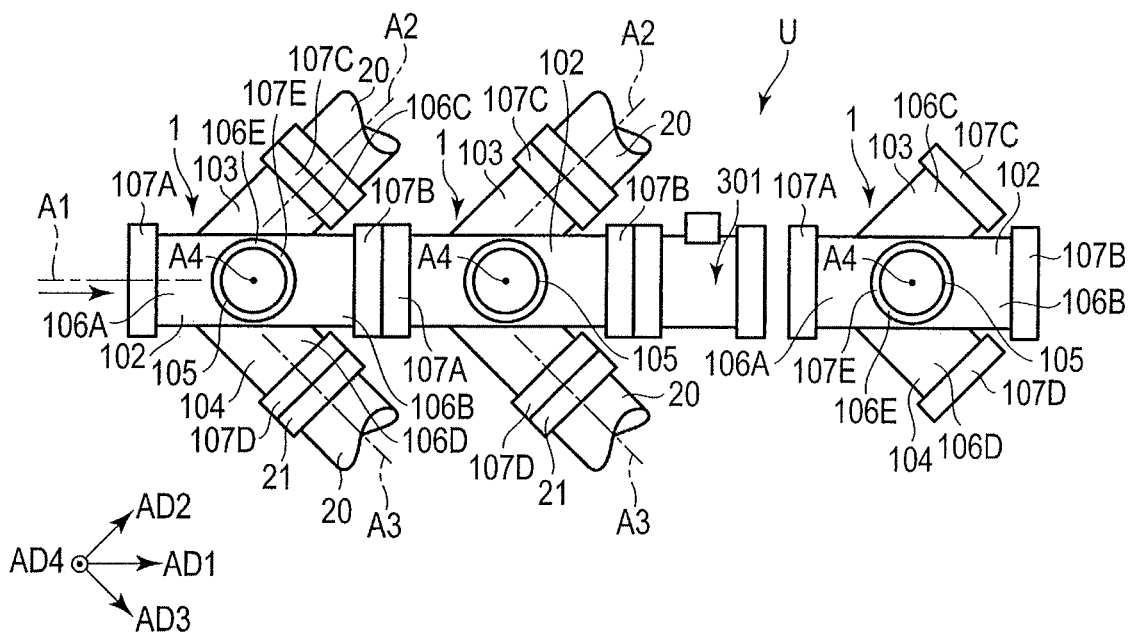
FIG. 14 is a plan view of a manifold of a fifth embodiment.

Now, the fifth embodiment will be described. In the present embodiment, another variation of the unit 1 will be described. FIG. 14 is a plan view of a schematic structure of the manifold U forming a flow path in which a plurality of units 1 of the present embodiment are combined. The manifold U is formed by partly dividing the units 100 of the third embodiment into units 1. The unit 1 includes a tube body 102, branches 103, 104, and 105, tube stubs 106A to 106E, and connection fittings 107A to 107E.

The tube body 102 is annular along the first axis direction AD1 and has tube stubs 106A and 106B at its both ends as first tube stubs, for example. Each branch 103 is annular along the second axis direction AD2 and has a tube stub 106C at its tip as a second tube stub, for example. Each branch 104 is annular along the third axis direction AD3 and has a tube stub 106D at its tip as a second tube stub, for example. Each branch 105 is annular along a fourth axis direction and has a tube stub 106E at its tip as a third tube stub, for example.

Connection fittings 107A to 107E are attached to the tube stubs 106A to 106E, respectively. The connection fittings 107A to 107E include the connection structure of same shape as connection fittings of connection targets without a male/female feature. In the present embodiment, since the connection fittings 107A and 107B have the same size, a plurality of units 1 can be connected in the first axis direction by the connection fittings 107A and 107B.

Furthermore, the units 1 include the rotation mechanisms as in the rotation mechanisms 7A to 7F of the second embodiment at the tube stubs 106A to 106E such that the connection fittings 107A to 1075 can individually rotate when the units 1 are connected together.

Furthermore, in FIG. 14, the first axis direction AD1, second axis direction AD2, third axis direction AD3, and fourth axis direction AD4 are defined. The second axis direction AD2 is inclined counterclockwise at an acute angle with respect to the first axis direction AD1, and the third axis direction AD3 is inclined clockwise at an acute angle with respect to the first axis direction AD1. The axis directions AD1 to AD3 are directions included in the same plan. Thus, while the axis of the tube body 102 (tube stubs 106A and 106B) is parallel to the first axis direction, the axis of the tube stub 106C (second axis direction AD2) and the axis of the tube stub 106D (third axis direction AD3) are regarded as the second axis direction crossing the first axis direction, and the axis of the tube stub 106E (fourth axis direction AD4) is regarded as the third axis direction crossing the plan including the first axis direction and the second axis direction.

That is, when the tube stubs 106A and 106B of the present embodiment are regarded as first tube stubs of the first and second embodiments, the tube stubs 106C and 106D correspond to the second tube stubs of the first and second embodiments, and the tube stub 106E corresponds to the third tube stub of the first and second embodiments.

Units 1 structure as above are connected together to form the manifold U having a three-dimensional flow path as in FIG. 14. FIG. 14 shows units 1 and a valve unit 301 between the units 1. The valve unit 301 can block the flow path in the manifold U and adjust the amount of water in the flow path. If a situation dictates reorganization of the manifold U, the downstream part of the valve unit 301 can be detached using the valve unit 301.

Furthermore, since the manifold U of FIG. 14 corresponds to the primary segment of the second embodiment, the secondary segment of the second embodiment can be formed by connecting the manifolds U such that the connection fittings 107C of the tube stubs 106C arranged in the second axis direction AD2 are connected together or that the connection fittings 107D of the tube stubs 106D arranged in the third axis direction AD3 are connected together. Furthermore, when the manifolds U as the secondary segments are connected vertically in two layers using the connection fittings 107E of the tube stubs 106E arranged in the fourth axis direction AD4, a greater manifold U can be formed.

Sixth Embodiment

Figure 15:
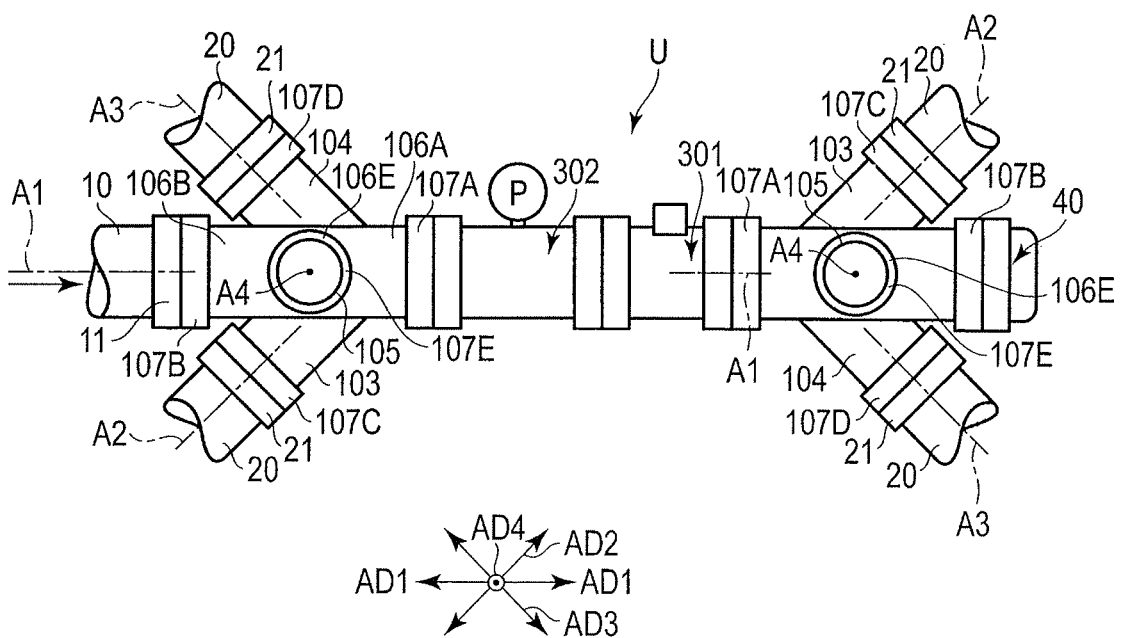
FIG. 15 is a plan view of a manifold of a sixth embodiment.

The sixth embodiment will be described. In the present embodiment, a variation of the manifold U will be described. FIG. 15 shows a manifold U including unit 1, and a valve unit 301 and a measurement unit 302 disposed within the unit 1. In the measurement unit 302, at least one of a pressure gauge, flowmeter, water temperature gauge, pH meter, and the like is incorporated. With the measurement unit 302 disposed within the unit 1 of the manifold U, the pressure, amount of current, water temperature, pH, and the like during the use of the manifold U can be measured.

With the units 1 of the present application connected together three-dimensionally by the flow path forming method of the present application, the manifold U of the present application having the three-dimensional flow path can be achieved.

The present invention can be achieved with various changes applied to the embodiments described above. For example, the structures of the embodiments may be arbitrarily combined. Modes changed without departing the scope of the invention can be encompassed within the claimed inventions and their equivalents.

For example, the tube stubs may be decreased or increased in the units of each embodiment.

Furthermore, connection fittings of units and accessories may include a male/female feature.

Furthermore, accessories included in the manifold are not limited to the hose, cap, relay fitting, and base. For example, a pressure gauge, pressure valve, or valve including a connection structure which can be connected to any tube stub of the unit may be added to the accessories. Furthermore, a filter connected to the unit by the same connection structure may be added to the accessories. The filter can be used to remove impurities from the fluid flowing in the unit, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A manifold comprising a plurality of units disposed in a liquid flow channel including a hose, wherein
    each of the units includes:
        a hollow tube body and three or more tube stubs to communicate an inside with an outside of the tube body; and
        a native connection fitting provided with each of the tube stub, the connection fitting which can be detachably connected to a connection target of same shape, wherein
    the manifold forms a flow path to communicate the tube stubs of the units to each other while the units are detachably connected together through the connection fittings, wherein
    the native connection fitting includes an annular fitting body, a plurality of protrusions arranged in a circumferential direction at the end of the fitting body, and recesses each formed between corresponding adjacent protrusions, and
    the protrusions of the native connection fitting fit in respective recesses of a complementary connection fitting of the connection target, and prohibits movement of the fitting body of the native connection fitting in an axial direction with respect to projections of the complementary connection fitting of the connection target, and
    wherein at least three of the tube stubs include:
        a first tube stub having an axis parallel to a first axis direction;
        a second tube stub having an axis parallel to a second axis direction crossing the first axis direction; and
        a third tube stub having an axis parallel to a third axis direction crossing a plan surface including the first axis direction and the second axis direction.

2. The manifold of claim 1, further comprising a base which supports at least two units such that the connection fittings thereof are opposed to match the axis of each of the tube bodies and that the connection fittings do not contact with the base.

3. The manifold of claim 2, wherein the tube body is annular,
    the connection fitting is annular where the outer diameter thereof is greater than that of the tube body,
    the base includes a pair of first supporting members extending in a first direction and arranged in parallel with each other with a first gap therebetween in a second direction crossing the first direction, and a pair of second supporting members extending in the first direction and arranged in parallel with each other with the first gap therebetween in the second direction,
    the pair of first supporting members and the pair of second supporting members are arranged linearly in the first direction with a second gap therebetween in the first direction,
    the first gap is less than the outer diameter of the tube body, and
    the second gap is greater than a sum of widths of the pair of connection fittings in the axial direction.

4. The manifold of claim 1, further comprising a cap including a connection structure which can connect to the connection fitting and blocking the tube stub.

5. The manifold of claim 1, further comprising a relay fitting including:
    a first opening;
    a second opening communicating the first opening and having a diameter different from that of the first opening;
    a first connection structure provided with the first opening and connectable to the connection fitting; and
    a second connection structure provided with the second opening and connectable to another connection fitting having a diameter which is different from that of the native connection fitting.

6. The manifold of claim 1, wherein the unit further comprises a rotation mechanism which rotatably connects the connection fitting and the tube stub.

7. The manifold of claim 1, wherein the tube body is shaped as an arc having the tube stubs at both ends thereof, and respective connection fitting are provided with the ends, and
    a circular flow path is formed by the respective tube bodies of the units when the units are connected to each other via the connection fittings at the ends.

8. A unit provided in a liquid flow channel including a hose, the unit comprising:
    a hollow tube body;
    three or more tube stubs communicating the inside of the tube body; and
    a native connection fitting provided with at least one of the tube stubs and detachably connected to a connection target of same shape, wherein
    the tube stubs include:

a first tube stub having an axis parallel to a first axis direction;

a second tube stub having an axis parallel to a second axis direction crossing the first axis direction; and a third tube stub having an axis parallel to a third axis direction crossing a plan surface including the first axis direction and the second axis direction, wherein the native connection fitting includes an annular fitting body, a plurality of protrusions arranged in a circumferential direction at the end of the fitting body, and recesses each formed between corresponding adjacent protrusions, and the protrusions of the native connection fitting fit in respective recesses of a complementary connection fitting of the connection target, and prohibits movement of the fitting body of the native connection fitting in an axial direction with respect to projections of the complementary connection fitting of the connection target.

9. A flow path forming method to form a manifold having a three-dimensional flow path using a plurality of units each including:

a first tube stub having an axis parallel to a first axis direction; a second tube stub having an axis parallel to a second axis direction crossing the first axis direction; a third tube stub having an axis parallel to a third axis direction crossing a plan surface including the first axis direction and the second axis direction; and connection fittings provided with each of the first, second, and third tube stubs and detachably connected to a connection target of same shape, the method comprising:

assembling two or more first segments, each first segment including at least two of the units connected in the first axis direction with the connection fittings of the respective first tube stubs of said at least two of the units, each native connection fitting, amongst the connection fittings of the first tube stubs, including an annular fitting body, a plurality of protrusions arranged in a circumferential direction at the end of the fitting body, and recesses each formed between corresponding adjacent protrusions, and the protrusions of the native connection fitting being configured to fit in respective recesses of a complementary connection fitting of a connection target, and to prohibit movement of the fitting body of the native connection fitting in an axial direction with respect to projections of the complementary connection fitting of the connection target;

assembling two or more second segments, each second segment including at least two of the first segments connected in the second axis direction with the connection fittings of the respective second tube stubs of the respective units to be connected; and assembling the manifold by connecting the second segments in the third axis direction with the connection fittings of the third tube stub of each unit of the second segments.

* * * * *